July 3, 1934.    H. KÜPPENBENDER ET AL    1,964,883
DISTANCE METER AND FINDER FOR PHOTOGRAPHIC CAMERAS
Filed March 5, 1932

INVENTORS
Heinz Küppenbender
Martin Nowicki
BY
ATTORNEY

Patented July 3, 1934

1,964,883

UNITED STATES PATENT OFFICE 1,964,883

DISTANCE METER AND FINDER FOR PHOTOGRAPHIC CAMERAS

Heinz Küppenbender and Martin Nowicki, Dresden, Germany, assignors to Zeiss Ikon A.-G., Dresden, Germany Application March 5, 1932, Serial No. 597,015

1 Claim. (Cl. 88—2.4)

This invention relates to improvements in cameras, particularly in the distance finders of such cameras in which two mirrors are used as basic finders.

With such devices it is necessary to reduce the picture for about one third to one-half of its size.

By the reducing operation the accuracy of adjustment of the finder is, however, jeopardized. If, therefore, a finder with reducing device for the picture is used in connection with a distance meter, the mirrors employed will partly be located between the lenses resulting in a duplication of the pictures as at this place no telecentric ray passage prevails.

We avoid this disadvantage by arranging the finder reducing the picture independently of the ray passage of the finder in or at the casing in such manner that it intersects the base of the finder, i. e. that the ray passage of the finder is crossing the ray passage of the distance meter.

This construction will enable us to retain the telecentric ray passage within the distance meter as no lenses are used and double pictures cannot appear in the ray passage of the rear silvered mirrors.

Another advantage of our invention in contradistinction to the finders which are entirely separated from the distance meter, is to be seen in the arrangement of the finder in such manner as not to require a special place on the camera, which is particularly important with miniature film cameras which offer a very limited space only for the attachment of the distance meter and finder.

These and other advantages of our invention will become more fully known as the description thereof proceeds, and will then be more specifically defined in the appended claim.

In the accompanying drawing forming a material part of this disclosure:

Figure 1:
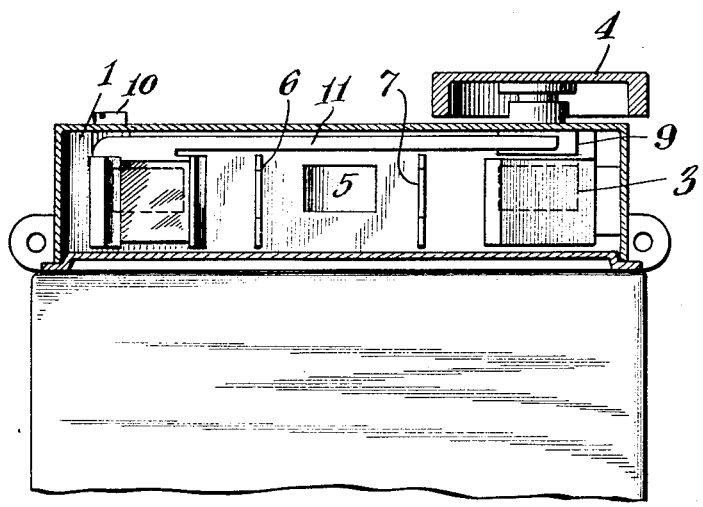
Fig. 1 is a fragmentary sectional side elevation of a camera equipped with a device illustrated according to our invention.
Figure 2:
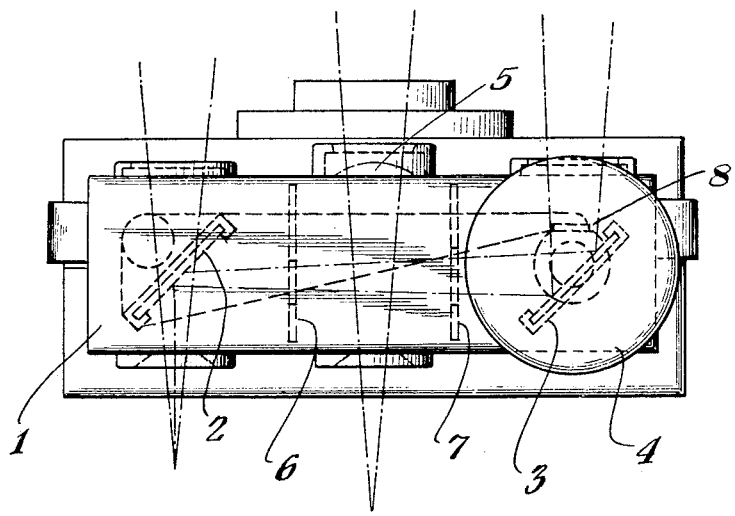
Fig. 2 is a top plan view thereof.

As illustrated, the distance meter comprises a casing 1 within which the two mirrors 2 and 3 are arranged, the half reflecting mirror 2 is adjustable by means of the knob 4. To this end the flattened upper portion 8 of the disk 9 carried by knob 4 functions as a cam operating lever 11 turning about the pivot pin 10 for mirror 2.

Between both mirrors 2 and 3 the finder 5 is arranged, and the ray passage of the finder is limited by means of the shutters 6, 7, between the mirrors 2 and 3, provided with suitable openings allowing the passage of the rays of the distance meter.

It will be understood that we have described and shown the preferred form of our device as one example only of the many possible ways to practically construct the same, and that we may make such changes in the general arrangement of our device and in the construction of the minor details thereof as come within the scope of the appended claim without departure from our invention.

Having thus described our invention what we claim as new and desire to secure by Letters Patent is:

In a camera, a distance meter, a casing, a half reflecting mirror and another mirror, adjusting means for one of said mirrors, said adjusting means comprising a knob having a stem, a disk carried by said stem having a flattened upper portion, an operating lever engaged by said flattened upper portion of said disk at one end, and a pivot pin for said half reflecting mirror and the other end of said lever for turning the half reflecting mirror, a finder arranged between both mirrors, said connections out of the path of light rays through the finder, and shutters provided with suitable openings allowing the passage of the rays of the distance meter to produce a crossing of the ray passage of the finder by the ray passage of the distance meter for retaining the telemetric ray passage in the distance meter and making the combination distance meter and finder adapted for use with small cameras.

HEINZ KÜPPENBENDER.
MARTIN NOWICKI.